(12) United States Patent
Dryfe et al.

(10) Patent No.: US 9,506,156 B2
(45) Date of Patent: Nov. 29, 2016

(54) PRODUCTION OF GRAPHENE

(71) Applicant: The University of Manchester, Manchester (GB)

(72) Inventors: Robert Angus William Dryfe, Manchester (GB); Ian Anthony Kinloch, Manchester (GB); Amr M. Abdelkader, Manchester (GB)

(73) Assignee: The University of Manchester, Manchester (GB)

( * ) Notice: Subject to any disclaimer, the term of this patent is extended or adjusted under 35 U.S.C. 154(b) by 0 days.

(21) Appl. No.: 14/383,877

(22) PCT Filed: Mar. 8, 2013

(86) PCT No.: PCT/GB2013/050573
§ 371 (c)(1),
(2) Date: Sep. 8, 2014

(87) PCT Pub. No.: WO2013/132261
PCT Pub. Date: Sep. 12, 2013

(65) Prior Publication Data
US 2015/0027900 A1    Jan. 29, 2015

(30) Foreign Application Priority Data

Mar. 9, 2012    (GB) .................................. 1204279.2

(51) Int. Cl.
C25B 3/04     (2006.01)
C01B 31/04    (2006.01)
C25B 1/00     (2006.01)
B82Y 30/00    (2011.01)
B82Y 40/00    (2011.01)

(52) U.S. Cl.
CPC .................. *C25B 3/04* (2013.01); *B82Y 30/00* (2013.01); *B82Y 40/00* (2013.01); *C01B 31/04* (2013.01); *C01B 31/0415* (2013.01); *C01B 31/0438* (2013.01); *C01B 31/0469* (2013.01); *C01B 31/0476* (2013.01); *C25B 1/00* (2013.01); *C01B 2204/04* (2013.01)

(58) Field of Classification Search
CPC .......... B82Y 30/00; B82Y 40/00; C25B 1/00
USPC ....................................................... 205/555
See application file for complete search history.

(56) References Cited

U.S. PATENT DOCUMENTS

| 4,486,286 | A | 12/1984 | Lewin et al. |
| 4,608,133 | A | 8/1986 | Morduchowitz et al. |
| 5,824,832 | A | 10/1998 | Sherif et al. |
| 7,071,258 | B1 | 7/2006 | Jang et al. |
| 2008/0206124 | A1 | 8/2008 | Jang et al. |
| 2009/0026086 | A1* | 1/2009 | Zhamu et al. ............... 205/555 |
| 2009/0090640 | A1* | 4/2009 | Jang et al. .................... 205/555 |
| 2009/0155578 | A1 | 6/2009 | Zhamu et al. |
| 2009/0169467 | A1 | 7/2009 | Zhamu et al. |
| 2013/0102084 | A1* | 4/2013 | Loh et al. ....................... 436/94 |
| 2013/0161199 | A1 | 6/2013 | Li et al. |
| 2013/0164208 | A1 | 6/2013 | Hsieh et al. |
| 2014/0061059 | A1 | 3/2014 | Dryfe et al. |

FOREIGN PATENT DOCUMENTS

| CN | 102465309 A | 5/2012 |
| GB | 217115 A | 6/1924 |
| GB | 1109143 A | 4/1968 |
| JP | 2001-89887 A | 4/2001 |
| JP | 2004-143488 A | 5/2004 |
| WO | 00/64808 A1 | 11/2000 |
| WO | 2006/037955 A1 | 4/2006 |
| WO | 2007/046713 A1 | 4/2007 |
| WO | 2007/093574 A2 | 8/2007 |
| WO | 2008/019154 A2 | 2/2008 |
| WO | 2011/010109 A1 | 1/2011 |
| WO | 2011/111791 A1 | 9/2011 |
| WO | 2011/162727 A1 | 12/2011 |
| WO | 2012/120264 A1 | 9/2012 |

OTHER PUBLICATIONS

Maluangnont et al. "Preparation of a Homologous Series of Graphite Alkylamine Intercalation Compounds Including an Unusual Parallel Bilayer Intercalate Arrangement" Chem. Mater. 2011, 23, 1091-1095.*
Liu et al. "Intercalation of Organic Ammonium Ions into Layered Graphite Oxide", Langmuir 2002, 19, 4926-4932.*
Matsuo et al. "Electrochemical fluorination of graphite in 47% HF aqueous solution" Journal of Fluorine Chemistry 87 (1998) 145-150.*
Zboril et al. "Graphene Fluoride: A Stable Stoichiometric Graphene Derivative and its Chemical Conversion to Graphene" Small 2010, 6, No. 24, 2885-2891.*
Canto-Marquez et al. "Ex-MWNTs: Graphene Sheets and Ribbons Produced by Lithium Intercalation and Exfoliation of Carbon Nanotubes" Nano Letters 2009 vol. 9, No. 4, 1527-1533.*
Alanyalioğlu et al., "The synthesis of graphene sheets with controlled thickness and order using surfactant-assisted electrochemical processes," *Carbon* 50:142-152, Jan. 2012.
Ang et al., "High-Throughput Synthesis of Graphene by Intercalation-Exfoliation of Graphite Oxide and Study of Ionic Screening in Graphene Transistor," *Journal of the American Chemical Society Nano* 3(11):3587-3594, Sep. 2009.
Bae et al., "Roll-to-roll production of 30-inch graphene films for transparent electrodes," *Nature Nanotechnology* 5:574-578, Aug. 2010.

(Continued)

*Primary Examiner* — Harry D Wilkins, III
(74) *Attorney, Agent, or Firm* — Seed IP Law Group LLP

(57) ABSTRACT

A method for the production of graphene and graphite nanoplatelet structures having a thickness of less than 100 nm in an electrochemical cell, wherein the cell comprises: (a) a negative electrode which is graphitic; (b) a positive electrode which may be graphitic or another material; and (c) an electrolyte which is ions in a solvent where the cations are organic ions and metal ions; and wherein the method comprises the step of passing a current through the cell.

18 Claims, 7 Drawing Sheets

(56) References Cited

OTHER PUBLICATIONS

Choi et al., "Improving the electrochemical properties of graphite/$LiCoO_2$ cells in ionic liquid-containing electrolytes," *Journal of Power Sources* 195:2368-2371, Apr. 2010.

Deng et al., "The adsorption properties of Pb(II) and Cd(II) on functionalized graphene prepared by electrolysis method," *Journal of Hazardous Materials* 183:923-930, Nov. 2010.

Ferrari et al., "Raman Spectrum of Graphene and Graphene Layers," *Physical Review Letters* 97:187104-1-187104-4, Oct. 2006.

Gao et al., "Electrodeposition of Aluminium from $AlCl_3$/$Et_3NHCl$ Ionic Liquids," *Acta. Phys.—Chim. Sin.* 24(6):939-944, Jun. 2008.

Geng et al., "Effects of Stage, Intercalant Species and Expangion Technique on Exfoliation of Graphite Intercalation Compound into Graphene Sheets," *Journal of Nanoscience and Nanotechnology* 11:1084-1091, Feb. 2011.

Hao et al., "Probing Layer Number and Stacking Order of Few-Layer Graphene by Raman Spectroscopy," *Small* 6(2):195-200, Nov. 2009.

Hernandez et al., "High-yield production of graphene by liquid-phase exfoliation of graphite," *Nature Nanotechnology* 3:563-568, Aug. 2008.

Kinloch et al., "Electrolytic, TEM and Raman studies on the production of carbon nanotubes in molten NaCl," *Carbon* 41:1127-1141, 2003.

Lee et al., "A graphite foil electrode covered with electrochemically exfoliated graphene nanosheets," *Electrochemistry Communications* 12:1419-1422, Oct. 2010.

Liu et al., "One-Step Ionic-Liquid-Assisted Electrochemical Synthesis of Ionic-Liquid-Functionalized Graphene Sheets Directly from Graphite," *Adv. Funct. Mater.* 18:1518-1525, May 2008.

Lotya et al., "Liquid Phase Production of Graphene by Exfoliation of Graphite in Surfactant/Water Solutions," *Journal of the American Chemical Society* 131:3611-3620, Feb. 2009.

Lu et al., "One-Pot Synthesis of Fluorescent Carbon Nanoribbons, Nanoparticles, and Graphene by the Exfoliation of Graphite in Ionic Liquids," *American Chemical Society Nano* 3(8):2367-2375, Aug. 2009.

Morales et al., "High-quality few layer graphene produced by electrochemical intercalation and microwave-assisted expansion of graphite," *Carbon* 49:2809-2816, Jul. 2011.

Novoselov et al., "Electric Field Effect in Atomically Thin Carbon Films," *Science* 306:666-669, Oct. 2004.

Park et al., "Chemical methods for the production of graphenes," *Nature Nanotechnology* 4:217-224, Apr. 2009.

Schwandt et al., "The preparation of nano-structured carbon materials by electrolysis of molten lithium chloride at graphite electrodes," *Journal of Eletroanalytical Chemistry* 647:150-158, Sep. 2010.

Simonet et al., "Electrochemical Behaviour of Graphite Cathodes in the Presence of Tetraalkylammonium Cations," *Journal of Electroanalytical Chemistry* 75:719-730, Jan. 1977.

Su et al., "High-Quality Thin Graphene Films from Fast Electrochemical Exfoliation," *Journal of the American Chemical Society Nano* 5(3):2332-2339, Feb. 2011.

Vallés et al., "Solutions of Negatively Charged Graphene Sheets and Ribbons," *Journal of the American Chemical Society* 130:15802-15804, Nov. 2008.

Wang et al., "Direct exfoliation of natural graphite into micrometor size few layers graphene sheets using ionic liquids," *Chemistry Communication* 46:4487-4489, May 2010.

Wang et al., "Highly efficient and large-scale synthesis of graphene by electrolytic exfoliation," *Carbon* 47:3242-3246, Nov. 2009.

Wang et al., "High-Yield Synthesis of Few-Layer Graphene Flakes through Electrochemical Expansion of Graphite in Propylene Carbonate Electrolyte," *Journal of the American Chemical Society* 133:8888-8891, May 2011.

Augustynski et al., "Electroreduction of Carbon Dioxide in Aqueous Solutions at Metal Electrodes," *American Chemical Society, Division of Fuel Chemistry*, pp. 1420-1424, Dec. 1996.

Augustynski et al., "Electroreduction of carbon dioxide in aqueous solutions at metal electrodes," *Preprints of Papers, American Chemical Society, Division of Fuel Chemistry*, Dec. 1996, retrieved from http://www.osti.gov/scitech/biblio/430375, retrieved on Oct. 23, 2014, 2 pages.

Besenhard et al., "Cathodic reduction of graphite in organic solutions of alkali and $NR_4^+$ salts," *Electroanalytical Chemistry and Interfacial Electrochemistry* 53:329-333, Jun. 1974.

Chung et al., "Origin of Graphite Exfoliation—An Investigation of the Important Role of Solvent Cointercalation," *Journal of the Electrochemical Society* 147(12):4391-4398, 2000.

DeWulf et al., "Electrochemical and Surface Studies of Carbon Dioxide Reduction to Methane and Ethylene at Copper Electrodes in Aqueous Solutions," *J. Electrochem. Soc.* 136(6):1686-1691, 1989.

Elias et al., "Control of Graphene's Properties by Reversible Hydrogenation: Evidence for Graphene," *Science* 323:610-613, Jan. 2009. (16 pages)

Gao et al., "Band Gap Tuning of Hydrogenated Graphene: H Coverage and Configuration Dependence," *J. Phys. Chem. C* 115:3236-3242, Feb. 2011.

Geim, "Graphene: Status and Prospects," *Science* 324:1530-1534, Jun. 2009.

Guisinger et al., "Exposure of Epitaxial Graphene on SiC(0001) to Atomic Hydrogen," *Nano Letters* 9(4):1462-1466, Mar. 2009.

Hsu et al., "Condensed-phase nanotubes," *Nature* 377:687, 1995.

Hsu et al., "Electrolytic formation of carbon nanostructures," *Chemical Physics Letters* 262:161-166, Nov. 1996.

Ilyin et al., "Computer simulation and experimental study of graphene-like structures formed by electrolytic hydrogenation," *Physica E* 43:1262-1265, Apr. 2011.

Jaiswal et al., "Controlled Hydrogenation of Graphene Sheets and Nanoribbons," *ACS Nano* 5(2):888-896, Jan. 2011.

Li et al., "Processable aqueous dispersions of graphene nanosheets," *Nature Nanotechnology* 3:101-105, Jan. 2008.

Malard et al., "Raman spectroscopy in graphene," *Physics Reports* 473:51-87, Apr. 2009.

Matis et al., "Surface Doping and Band Gap Tunability in Hydrogenated Graphene," *ACS Nano* 6(1):17-22, Jan. 2012.

Otake et al., "CO2 decomposition using electrochemical process in molten salts," *Journal of Physics: Conference Series* 379(1):012038, Jun. 2012. (10 pages)

Poh et al., "High-pressure hydrogenation of graphene: towards graphane," *Nanoscale* 4:7006-7011, Sep. 2012.

Ryu et al., "Reversible Basal Plane Hydrogenation of Graphene," *Nano Letters* 8(12):4597-4602, Nov. 2008.

Simate et al., "The production of carbon nanotubes from carbon dioxide challenges and opportunities," *Journal of Natural Gas Chemistry* 19:453-460, Sep. 2010.

Sofo et al., "Graphane. A two-dimensional hydrocarbon," *Physical Review B* 75:153401, Apr. 2007. (4 pages)

Yang et al., "Birch Reduction of Graphite. Edge and Interior Functionalization by Hydrogen," *J. Am. Chem. Soc.* 134:18689-18694, Oct. 2012.

Zhang et al., "Physical Properties of Ionic Liquids: Database and Evaluation," *J. Phys. Chem. Ref. Data* 35(4):1475-1517, Oct. 2006.

\* cited by examiner

PRODUCTION OF GRAPHENE

FIELD OF INVENTION

The present invention relates to a method for the production of graphene and related graphite nanoplatelet structures.

BACKGROUND

Graphene is an atomically thick, two dimensional sheet composed of $sp^2$ carbons in a honeycomb structure. It can be viewed as the building block for all the other graphitic carbon allotropes. Graphite (3-D) is made by stacking several layers on top of each other, with an interlayer spacing of ~3.4 Å and carbon nanotubes (1-0) are a graphene tube.

Single-layer graphene is one of the strongest materials ever measured, with a tensile strength of ~130 GPa and possesses a modulus of ~1 TPa. Graphene's theoretical surface area is ~2630 m$^2$/g and the layers are gas impermeable. It has very high thermal (5000 W/mK) and electrical conductivities (up to 6000 S/cm).

There many potential applications for graphene, including but not limited to:

(a) additive for mechanical, electrical, thermal, barrier and fire resistant properties of a polymer;

(b) surface area component of an electrode for applications such as fuel cells, super-capacitors and lithium ion batteries;

(c) conductive, transparent coating for the replacement of indium tin oxide; and (d) components in electronics.

Graphene was first reported in 2004, following its isolation by Professor Geim's group. Graphene research since then has increased rapidly. Much of the "graphene" literature is not on true monolayer graphene but rather two closely related structures:

(i) "few layer graphene", which is typically 2 to 10 graphene layers thick. The unique properties of graphene are lost as more layers are added to the monolayer and at 10 layers the material becomes effectively bulk graphite; and (ii) Graphene oxide (GO), which is a graphene layer which has been heavily oxidised in the exfoliation process used to make it and has typically 30 at % oxygen content. This material has inferior mechanical properties, poor electrical conductivity and is hydrophilic (hence a poor water barrier).

There are a variety of methods to produce graphene [Ruoff 2009]. Novoselov et al. produced their first flakes by the mechanical exfoliation of graphite by using an adhesive tape to isolate individual layers [Novoselov 2004]. It has been shown subsequently that graphite can also be exfoliated by using ultrasonic energy to separate the layers when in an appropriate solvent, such as NMP (N-methyl pyrrolidone) [Coleman 2008 & 2009].

Wang et al. have shown that ionic liquids are also appropriate solvents for ultrasonic exfoliation. In this case, they mixed graphite powder with ionic liquids such as 1-butyl-3-methyl-imidazolium bis(trifluoromethanesulfonyl)imide ([Bmim][Tf2N]) and then subjected the mixture to tip ultrasonication for a total of 60 minutes using 5-10 minute cycles. The resultant mixture was then centrifuged [Wang 2010]. Ionic liquids are used to stabilise the graphene produced by the ultrasonication.

Intercalation compounds can be produced by introducing a metal through the vapour phase and then reacting these ions—the layers of the intercalation compound can then be separated by stirring in an appropriate solvent, such as NMP [Valles 2008]. An intercalation approach has also been taken to separate graphene oxide aggregates by electrostatically attracting tetrabutylammonium cations in between the layers of the graphene oxide [Ang 2009]. This technique relies on the charges present in graphene oxide to attract the tetrabutylammonium cations.

Graphene can also be produced by chemical vapour deposition. For example, methane can be passed over copper [Bae 2010]. Alternatively silicon carbide can be decomposed to make a graphene film.

Electrochemical approaches can also be taken to exfoliate the graphene. Liu et al. [Liu 2008] reported the exfoliation of graphite using an ionic liquid-water mixture electrolyte to form "kind of IL-functionalized" graphene nanosheets. Scheme 1 in this paper suggests that the material was produced by the exfoliation of the anode but in their discussion the authors mention the role of the cation. Lu subsequently studied the route in more detail and discussed the possible mechanism involved in the production process [Lu 2009]. In their paper, they stated "according to the proposed mechanism by Liu, the positively charged imidazolium ion is reduced at the cathode to form the imidazolium free radical which can insert into the bonds of the graphene plane. At the fundamental level, there are several questionable aspects about the radical-insertion mechanism proposed by Liu, especially when the ILs are mixed with water at 1:1 ratio and where an operational voltage as high as 15 V is applied". Lu et al. showed that the graphene nanosheet production is exclusively at the anode and is due to an interaction of decomposed water species and the anions from the ionic liquid, such as $BF_4^-$.

WO 2011/162727, discloses the formation of graphene using lithium ion exfoliation of graphite, the exfoliation being aided by the insertion of solvent between the layers and sonication. This work is also discussed in a related paper [Wang 2011].

The co-pending international application, filed on 9 Mar. 2011 claiming priority from GB1104096.1 (filed 10 Mar. 2011), entitled "Production of Graphene", describes the production of graphene by the electrochemical intercalation of alkylammonium ions into graphitic cathodes.

Further methods for the production of graphene are desired—in particular, methods that produce graphene sheets with a controlled number of layers and flake size. Advantageously, the methods should be scalable to allow for the production of graphene on a large scale.

DESCRIPTION OF THE INVENTION

The present inventors have conceived a method for the production of graphene and related graphite nanoplatelet structures by exfoliation driven by the electrochemical insertion of both positive organic ions (e.g. alkylammonium ions) and positive metal ions (e.g. iron, tin, lithium ions) into a negative graphitic electrode. Without wishing to be bound by theory, it is thought that by using cations to exfoliate the negative electrode, the possibility of the formation of graphene oxide through oxidative attack is reduced.

In the present application, the term "graphene" is used to describe materials consisting of ideally one to ten graphene layers, preferably where the distribution of the number of layers in the product is controlled. The method can also be used to make graphite nanoplatelet structures under 100 nm in thickness, preferably under 10 nm in thickness and more preferably under 1 nm in thickness. The size of the graphene flakes produced can vary from nanometers across to millimeters, depending on the morphology desired.

In some aspects of the invention, the material produced is graphene having up to ten layers. The graphene produced may have one, two, three, four, five, six, seven, eight, nine or ten layers. It may be preferred that the material produced is substantially free of graphene oxide. "Substantially free" means less than 10% by weight, preferably less than 5% by weight, more preferably less than 1% by weight of graphene oxide.

In other aspects of the invention, the material produced may comprise at least 10% by weight of graphene having up to ten layers, preferably at least 25% by weight and more preferably at least 50% by weight of graphene having up to ten layers.

The intercalation of cations into graphite cathodes (negative potential) under electrochemical reactions is well known and is, for example, the basis of lithium ion batteries. It is also known that if too many ions are intercalated then the negative electrode disintegrates. Furthermore, the size of the cation has a significant effect. For example, Simonet and Lund reported in 1977 whilst studying the electrochemical behaviour of graphite negative electrodes in the presence of tetralkylammonium cations that "in the presence of very large cations the cathode disintegrates" [Simonet 1977].

Under the right conditions the fragments from the disintegrated negative electrode can be nanoscale forms of a carbon. The production of carbon nanotubes from the intercalation of alkali metal ions into a graphite cathode has been reported by Kinloch et al. [Kinloch 2003]. These nanotubes were produced using a molten alkali halide electrolyte at high temperatures (600° C. or higher). In addition to carbon nanotubes, graphite platelets, carbon nanoparticles and amorphous structures were observed. However, no graphene was reported.

The present invention provides a method for the production of graphene and graphite nanoplatelet structures having a thickness of less than 100 nm in an electrochemical cell, wherein the cell comprises:
 (a) a negative electrode which is graphitic;
 (b) a positive electrode which may be graphitic or another material; and
 (c) an electrolyte which consists of ions in a solvent, where the cations are organic ions and metal ions;
and wherein the method comprises the step of passing a current through the cell.

The negative electrode is the electrode held at the most negative potential out of the two electrodes. A reference electrode may also be used.

Negative Electrode

The negative electrode may comprise a layered graphite compound in which cations can be intercalated. Preferred materials include highly ordered pyrolytic graphite (HOPG), natural and synthetic graphite. The electrode may be a single graphitic crystalline flake or many flakes held together. In the latter case, the crystals may be placed on a conductive surface, physically pressed together or held together using a binder such a pyrolysed polymer (e.g. an extruded graphite rod). They also may be held together in a porous box or basket. The minimum lateral dimensions of the graphite flakes are preferably at least 1 nm, more preferably at least 100 nm and most preferably at least 1 micron. The maximum lateral dimensions of the graphite flakes are preferably no more than 10 cm, more preferably no more than 1 mm and most preferably no more than 100 microns. In one embodiment, the flakes are orientated so that the [002] direction is parallel to the surface of the electrode, exposing the galleries for intercalation. In further embodiments, the maximum lateral dimensions of the graphite flakes are preferably no more than 1 micron or 10 microns.

The negative electrode may comprise partially exfoliated graphene oxide.

The negative electrode material may be treated prior to use in order to improve its electrochemical exfoliation. In one embodiment the electrode is made from material which has been previously partially exfoliated using other methods such gaseous expansion or intercalation from the vapour phase. For example, commercially available material from companies such as XG Sciences and Angstrom could be used for the electrode material.

In some embodiments, the negative electrode may be of a ladle design to avoid issues with disintegration of the electrode into large pieces. In other embodiment, the graphite negative electrode may be held at a liquid-liquid interface. In such an embodiment, the negative electrode may be a liquid metal such as mercury or gallium on which graphite flakes are placed, allowing continual contact with the graphitic material as it is exfoliated into the desired material.

In some embodiments, the negative electrode may be surrounded by a membrane. Without wishing to be bound by theory, the use of a membrane may help retain any exfoliated material in electrical contact with the negative electrode allowing for further intercalation of the cations. In some embodiments, the pore size of the membrane may vary from 10 nm to 500 nm. Suitable membranes include cellulose dialysis membrane (e.g., Spectra Por 7, 25 nm pores); and (b) polycarbonate membranes (e.g. 450 nm pores).

Positive Electrode

The positive electrode may consist of any suitable material known to those skilled in the art as it does not play a role in the graphene production, other than to provide a counter electrode for the anions. Preferably, the positive electrode is made from an inert material such as gold, platinum or carbon. In further embodiments, the positive electrode may be made of a material that oxidises to give the metal ions in the electrolyte, such as lithium.

When the reaction at the positive electrode generates a gas the electrode surface area is as large as possible to prevent gas bubbles wetting it and/or disrupting the process at the negative electrode. The positive and/or reference electrode may also be placed in a membrane or molecule sieve to prevent undesired reactions in the electrolyte or at either electrode. The positive and the negative electrodes could alternatively be placed in a two-compartment cell, wherein the each compartments contains one electrode, and the compartments are connected through a channel.

Electrolyte

The electrolyte comprises ions in a solvent, wherein the cations are organic ions and metal ions. Therefore the electrolyte contains both organic ions and metal ions.

The organic ions are preferably alkylammonium cations, particularly tetralkyl, trialkyl and dialkyl ammonium cations.

Tetraalkyl ammonium cations are preferable, including tetrabutyl ammonium (TBA, $[(C_4H_9)_4N^+]$), tetraethyl ammonium (TEA, $(C_2H_5)_4N^+$) and tetramethyl ammonium (TMA, $(CH_3)_4N^+$). The alkyl chains may contain up to 100 carbon atoms, more preferably up to 20 carbon atoms and most preferably up to 5 carbon atoms long. The alkyl chains may contain only a single carbon atom, but preferably contain at least two carbon atoms. The alkyl chains may all be the same, or may be different. Furthermore, a mixture of different cations maybe used.

Dialkylammonium cations and trialkylammonium cations may be also used in the invention, including tributyl ammonium ([(C$_4$H$_9$]$_3$NH$^+$), triethyl ammonium ((C$_2$H$_5$)$_3$NH$^+$), triemethyl ammonium ((CH$_3$)$_3$NH$^+$), dibutyl ammonium ([(C$_4$H$_9$]$_2$NH$_2^+$), diethyl ammonium ((C$_2$H$_5$)$_2$NH$_2^+$) and diemethyl ammonium ((CH$_3$)$_2$NH$_2^+$). The alkyl chains may contain up to 100 carbon atoms, more preferably up to 20 carbon atoms and most preferably up to 5 carbon atoms long. The alkyl chains may contain only a single carbon atom, but preferably contain at least two carbon atoms. The alkyl chains may all be the same, or may be different.

Furthermore, a mixture of different cations may be used, including a mixture of dialkylammonium cations, trialkylammonium cations and tetraalkyl ammonium cations.

Other organic cations suitable for use in the present invention may include alkylphosphonium cations, such as tetraalkyl phosphonium cations.

The counter-ions for the alkylammonium cations may be, e.g. tetrafluoroborate (BF$_4^-$), perchlorate (ClO$_4^-$) or hexafluorophosphate (PF$_6^-$). Other soluble, inorganic ions may be used, such as tetraphenyl borate or chloride.

The metal ions can be selected from, for example, iron, tin and lithium ions, and thus can be Fe$^{2+}$, Fe$^{3+}$, Sn$^{2+}$ and Li$^+$. The metal ions may also be selected from K$^+$, Na$^+$ and Al$^{3+}$ and rare earth ions.

The counter-ions for the metal ions may be chloride or any other soluble anions (such as the counter-ions listed above for the alkylammonium cations, e.g. tetrafluoroborate (BF$_4^-$). perchlorate (ClO$_4^-$) or hexafluorophosphate (PF$_6^-$)). The counterions should not be those that can attack the graphite.

Solvents which can be used include NMP, DMSO (dimethyl sulfoxide), DMF (N,N'-dimethyl formamide) and mixtures thereof, which are examples of organic solvents. In one embodiment, the solvent used has an affinity for graphene or graphite nanoplatelet structures so that the material produced at the electrode is taken away by the solvent. In another embodiment, the solvent has no affinity for graphene or graphite nanoplatelet structures, so that the material produced falls to the bottom of the electrochemical cell, allowing easy collection of the graphene produced.

It may be preferred that the electrolyte is formed by making a eutectic mixture of the alkylammonium salt and metal ion salt, with the subsequent addition of a solvent. This allows the method of the invention may be carried out at an appropriate cell operating temperature and avoid the need to operate with molten salts. This method of forming salt in solvent mixtures has been described in U.S. Pat. No. 5,824,832 and in Gao 2008. Particular preferred mixtures include a eutectic phase formed between 1:1 mixtures of triethylammonium hydrochloride and ferric chloride, followed by the addition of solvent (DMSO, NMP or a 1:1 mixture of DMSO:NMP) to this eutectic. The replacement of ferric chloride with lithium chloride, to form 1 molar solutions in each of the previous solvent systems may also be preferred.

In some embodiments, the concentration of the alkyl ammonium cations may be a minimum of 1 mM, 0.1 M, 0.2 M or 0.5 M. The maximum concentration may be 2M, 1.5M or 1M.

In some embodiments, the concentration of the metal cations may be a minimum of 1 mM, 0.1 M, 0.2 M or 0.5 M. The maximum concentration may be 2M, 1.5M or 1M.

In some embodiments, the electrolyte and the organic and metal ion salts are suspended in the solvent with concentrations above the saturation limit of the solvent.

Cell Potential and Current Density

The working potential of the cell will be at least that of the standard potential for reductive intercalation. An overpotential may be used in order to increase the reaction rate and to drive the cations into the galleries of the graphite at the negative electrode. Preferably an overpotential of 1 mV to 10 V is used against a suitable reference as known by those skilled in the art, more preferably 1 mV to 5 V. In cells, with only two terminals, and no reference, a larger potential may be applied across the electrodes but a significant amount of the potential drop will occur over the cell resistance, rather than act as an overpotential at the electrodes. In these cases the potential applied may be up to 20V or 30V.

The voltage applied across the electrodes may be cycled or swept. In one embodiment, both the electrodes are graphitic and the potential is swept so that electrodes change from positive to negative and vice versa. In this embodiment the cationic exfoliation would occurs at both electrodes, depending on the polarity of the electrode during the voltage cycle. In some embodiment, alternating current can be used to allow for both fast intercalations and de-intercalations.

The current density at the negative electrode will be controlled through a combination of the electrode's surface area and overpotential used. The method can also be carried out under current control.

Operating Temperature

The cell is operated at a temperature which allows for production of the desired material.

The cell may be operated at a temperature of at least 10° C., preferably at least 20° C. The maximum cell operating temperature may be 100° C., and more preferably 90° C., 80° C., 70° C. or 50° C. In some embodiments, the cell may be operated at a temperature of at least 30, 40 or 50° C. The maximum cell operating temperature may be as high as 120° C. The optimum operating temperature will vary with the nature of the solvent. Operating the cell up to the boiling point of the electrolyte may be carried out in the present invention.

Recovery of Cations

In one embodiment, the cations used for the exfoliation is recovered after exfoliation. The cations may be recovered by washing and for heating of the exfoliated material, electrochemical reduction of the cations, ultrasonic energy treatment of the exfoliated material, displacement from the exfoliated material by surfactants or combinations thereof.

Further Method Steps

In one embodiment, organic ions may be added in a second stage, in order to favour the exfoliation of graphite through a process of polymerization and expansion between the graphene layers. Suitable organic ions include monomers for polymerisation possessing electron-withdrawing groups such as nitrile, carboxyl, phenyl, and vinyl.

The graphene or graphite nanoplatelet structures having a thickness of less than 100 nm produced by the method of the invention may be separated from the electrolyte by a number of separation techniques, including:

(a) filtering;

(b) using centrifugal forces to precipitate the graphene or graphite nanoplatelet structures;

(c) collecting the graphene or graphite nanoplatelet structures at the interface of two immiscible solvents; and (d) sedimentation.

The electrochemically exfoliated graphene or graphite nanoplatelet structures may be further treated after exfoliation. For example, the materials may be further exfoliated using ultrasonic energy and other techniques known to those skilled in the art to decrease the flake size and number of graphene layers.

In some embodiments, the electrochemical intercalation may be repeated in order to achieve full exfoliation.

The graphite at the negative electrode may be functionalised electrochemically prior to its exfoliation, for example, by oxidation in nitric acid or fluorination using hydrofluoric acid. In these cases the negative electrode would become the positive electrode during the functionalisation. In some circumstances, the voltage may be reversed to cycle the electrochemical exfoliation and functionalisation steps.

Analysis of Graphene by Raman Spectroscopy

It is well established in the literature that Raman spectroscopy can be used to measure the number of layers that a flake possesses through the shape, intensity and position of the G (~1580 cm$^{-1}$) and 2D (~3200 cm$^{-1}$) peaks (some of the literature calls the 2D peak the G' peak.) The exact positions of the peaks depend on the excitation wavelength used and the level of doping in the sample [Ferrari 2006]. In general, single layer graphene comprises of 2D peak which can be fitted with a single component and is similar or higher in intensity than the G peak. This G' peak is at approximately 2637 cm$^1$ when measured using a 633 nm excitation laser. As the number of layers increase, the G' peak decreases in relative intensity to the G peak. The G' peak also widens and its position increases in wavenumber [Hao 2010]. For example, the 2D peak for two layers is well described by four components.) Significantly as the number of layers increase, the spectra become less symmetrical and approaches a peak with two components with a main peak with a less intense shoulder at a lower wavenumber.

The G' peak would be expected to be centred at approximately 2637, 2663, 2665, 2675 and 2688 cm$^{-1}$ for 1-layer, 2-layer, 3-layer, many-layer and graphite respectively using a 633 nm laser to measure flakes deposited on a silicon oxide wafer.

BRIEF DESCRIPTION OF THE DRAWINGS

FIG. 1a shows the Raman spectra of the material produced in Example 1a;
FIG. 2a shows the Raman spectra of the material produced in Example 2a;
FIG. 3a shows the Raman spectra of the material produced in Example 3a.

EXAMPLES

General Conditions for Examples 1 to 4

All the electrochemical experiments were conducted in 50 ml glass bakers. The beaker was sealed using rubber plug or custom-made plastic lid. The electrodes are fixed on the lid so that the electrode separation is fixed at 5 mm at the start of the run. To control the surface area of the electrodes, the electrodes were attached to stainless steel rods that are allowed to move vertically using a M4 screw threaded onto the lid. All the Raman spectroscopy was conducted using a 633 nm excitation laser.

Example 1

A cell was assembled having graphite rods as both electrodes, with the electrolytes as detailed below. The cell was operated at room temperature, and a potential of 20V was applied with a continual reversal of polarity (every 3 minutes for an hour). In examples (a) to (d) an inert atmosphere was maintained in the cell, using argon. After the end of the run, the electrolyte was leached in a multistep process using acidified water, distilled water, ethanol, and acetone. The resultant powder was filtered out using 10 nm pore diameter filter paper. The electrolytes used were:

(a) electrolyte: 0.1 M Et$_3$NCl, 0.1 M LiCl, 20 mL DMSO;
(b) electrolyte: 1 M Et$_3$NCl, 1 M LiCl, 20 mL DMSO;
(c) electrolyte: 1 M Et$_3$NCl, 1 M LiCl, 20 mL NMP;
(d) electrolyte: 1 M Et$_3$NCl, 1 M LiCl, 20 mL DMSO/NMP (1:1);
(e) electrolyte: 0.1 M Et$_3$NCl, 0.1 M LiCl, 20 mL DMSO—air not excluded.

Results (a) 1.08 g of powder was obtained. The Raman spectrum (FIG. 1a) shows a band centred at 2659 cm$^{-1}$ with a width of 56.159 cm$^{-1}$. These values are typical of a graphene sample with less than 3 layers.

(b) 0.84 g of powder was obtained. The Raman spectrum (FIG. 1b) shows an asymmetrical 2D band centred at 2668 cm$^{-1}$, which may be indicative of few layer graphene.

(c) The Raman spectrum (FIG. 1c) shows a symmetrical 2D band centered at 2655 cm$^{-1}$.

(d) The Raman spectrum (FIG. 1d) evidences the formation of few layer graphene.

Figure 1A:
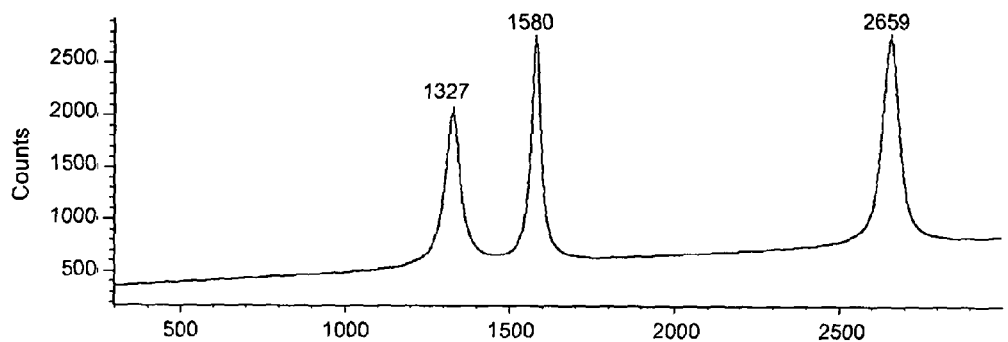
Figure 1B:
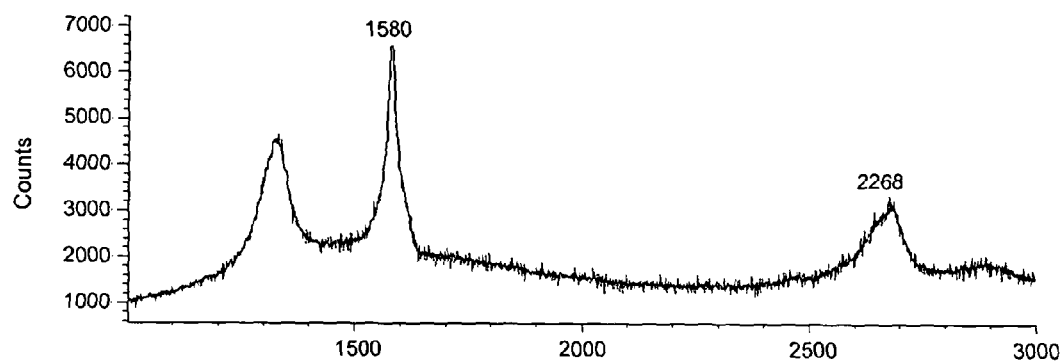
FIG. 1b shows the Raman spectra of the material produced in Example 1b.
Figure 1C:
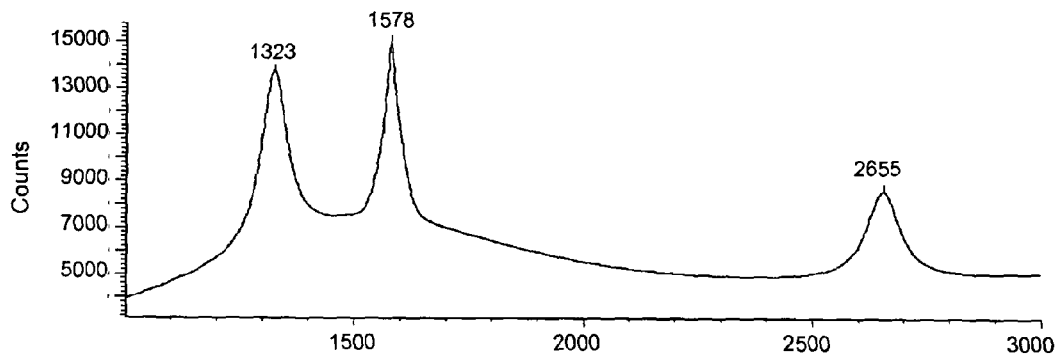
FIG. 1c shows the Raman spectra of the material produced in Example 1c.
Figure 1D:
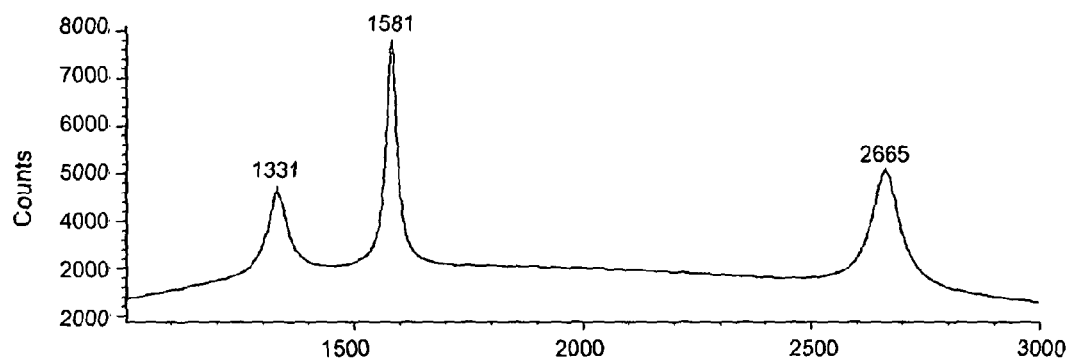
FIG. 1d shows the Raman spectra of the material produced in Example 1d.

(e) The Raman spectrum was almost identical to that in FIG. 1a, indicating the effect of the absorbed gases and/or moisture from atmosphere is negligible.

Example 2

A cell was assembled as in Example 1, except that one electrode was a graphite rod and the other was platinum. An Ag/AgCl reference electrode was used. The following experiments were carried out:

(a) electrolyte: 1 M Et$_3$NCl, 1 M UCi DMSO; The potential was cycled on the graphite rod between 5V and −5V at a rate of 50 mV/s for 5 cycles;
(b) electrolyte: 1 M Et$_3$NCl, 1 M LiCl, DMSO: as for (a), except a 200 mA and −200 mA constant current was applied for durations of 90 second each and the cycle repeated for 30 minutes;
(c) electrolyte: 1 M Et$_3$NCl, 1 M LiCl, DMSO; 10V potential applied with constant negative potential applied to graphite for 10 minutes.

Figure 2A:
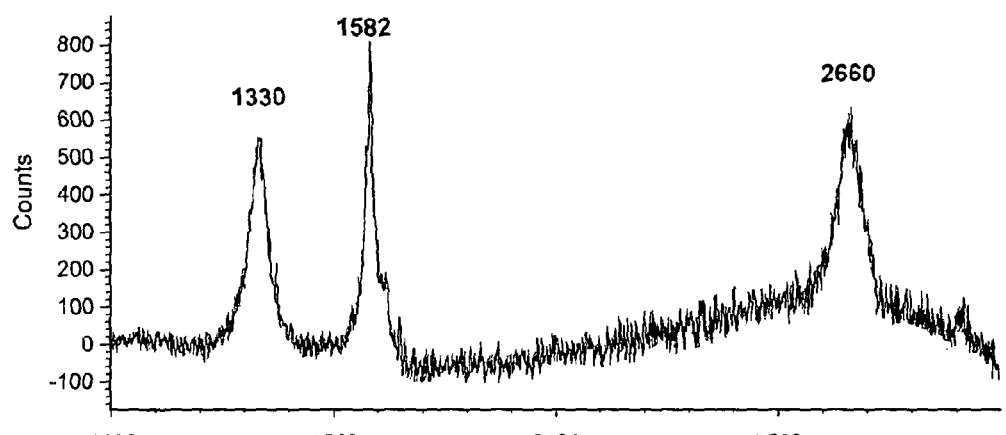

Results (a) About 0.4 g of black powder was collected after washing and filtering. The Raman spectrum shown in FIG. 2a, has the 2D peak centered at 2660 cm$^{-1}$ with a width of 72.3 cm$^{-1}$.

Figure 2B:
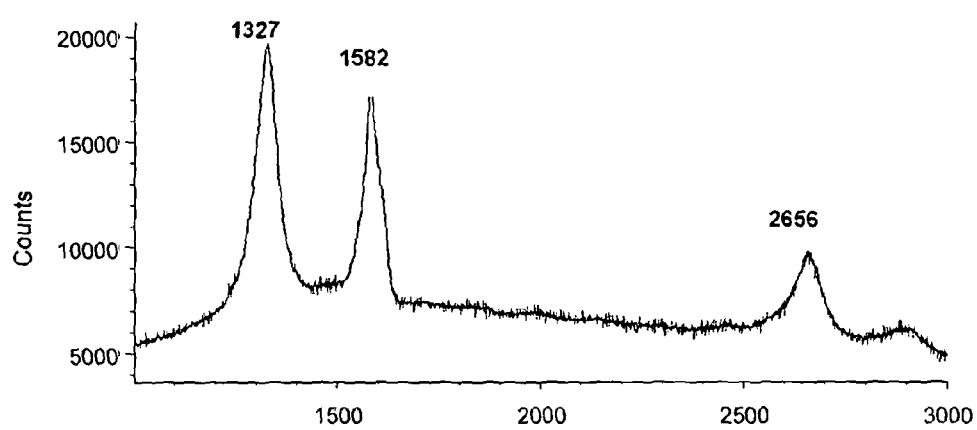
FIG. 2b shows the Raman spectra of the material produced in Example 2b.

(b) The Raman spectrum shown in FIG. 2b, has the 2D peak centered at 2656 cm$^{-1}$ with a width of 80.1 cm$^{-1}$.

Figure 2C:
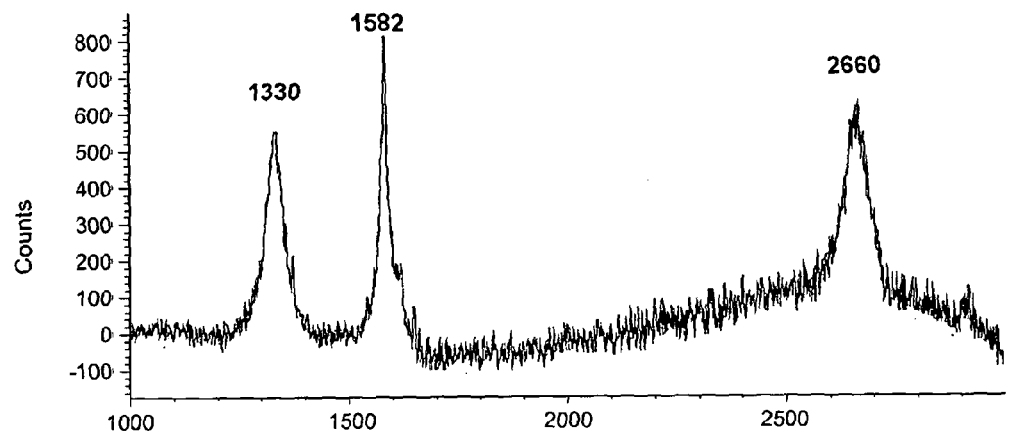
FIG. 2c shows the Raman spectra of the material produced in Example 2c.

(c) The Raman spectrum is shown in FIG. 2c, AFM (atomic force microscopy) of samples gave a flake thickness of 1.3 nm, which suggests mono or bilayer graphene, and 3.5 nm which is indicative of five-layer graphene [Novoselov 2004].

Example 3

Figure 3A:
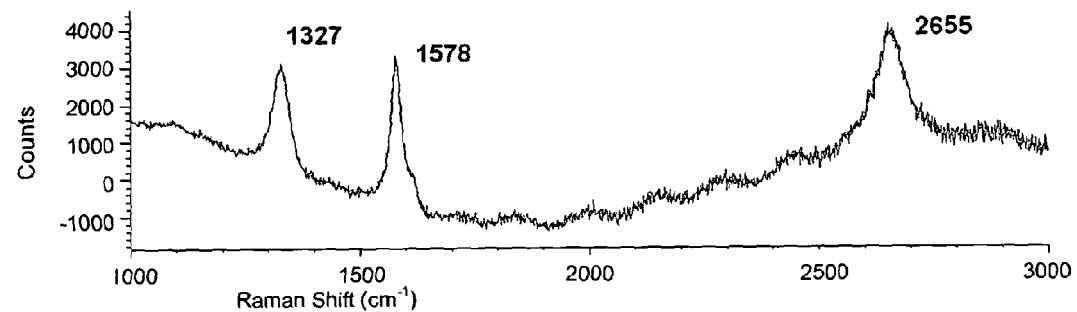
Figure 3B:
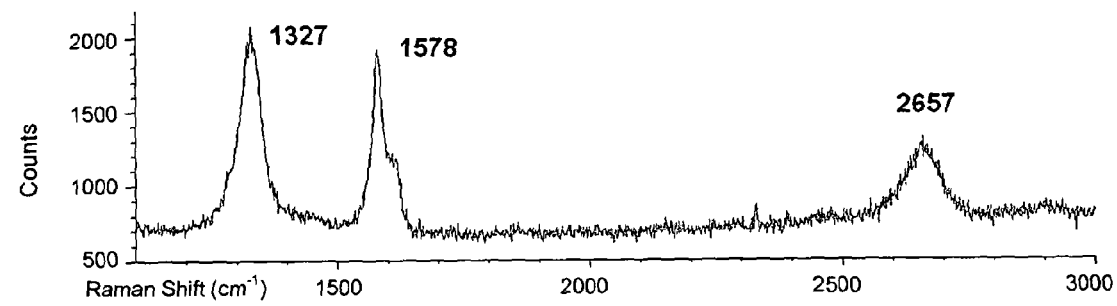
FIG. 3b shows the Raman spectra of some of the material produced in Example 3b.
Figure 3C:
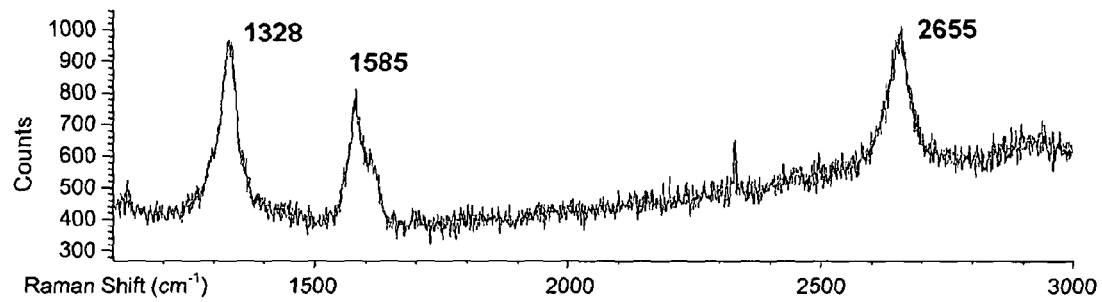
FIG. 3c shows the Raman spectra of other material produced in Example 3b.

A cell was assembled as in Example 1, and operated as follows:
(a) electrolyte: 0.5 M TMA (tetramethylammonium) Cl, 1.4 M LiCl; 20 ml DMSO; 20V potential applied with constant negative potential applied to graphite for 10 minutes;
(b) electrolyte: 0.5 M TMA Cl, 1.4 M LiCl, 20 ml NMP; 20V potential applied with constant negative potential applied to graphite for 1.5 hours.
Results
(a) The Raman spectrum is shown in FIG. 3a,
(b) Raman spectra of the resulting material are shown in FIGS. 3b and 3c. The first appears to be very close to few layer graphene and the other one suggestive of less than 3 layer graphene (the width of the 2D peak is 48 $cm^{-1}$).

Example 4

A cell was assembled as above having a graphite rod as the working electrode, Li as the counter electrode, and Ag/AgCl as a reference electrode. The electrolyte was 1 M $Et_3NCl$, 1 M LiCl, 0.5 M KCl in 20 mL DMSO. The potential was held at 2V vs Ag/AgCl for 10 minutes, then linearly swept at 10 $mVs^{-1}$ until −6V, held at −6V for 10 minutes and then swept back to 0V at a rate of 10 mvs. The cycle was repeated 20 times.

Figure 4:
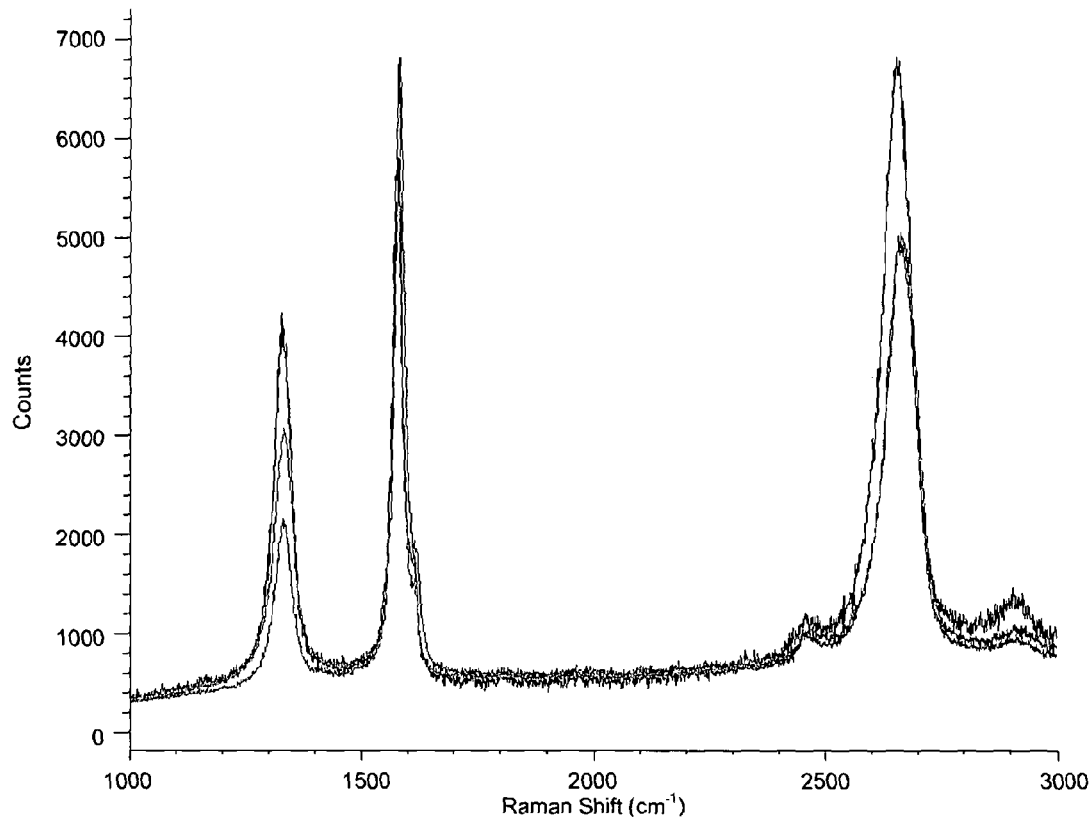
FIG. 4 shows the Raman spectra of material produced in Example 4.

About 0.67 g of powder was obtained. The Raman spectrum is shown in FIG. 4a. AFM was carried out, showing thickness between 1 to 5 nm. SEM (scanning electron microscopy) showed particles size up to 35 microns. TEM images and diffraction patterns showed a typical graphene structure with some mono layer content.

Example 5

A graphite pellet (12 mm diameter, 2 mm thickness, surface area 2.9 $cm^2$ facing electrolyte) was used as the cathode, and 0.5 mm diameter Pt wire was employed as the anode. These were placed in a 50 ml glass container in a two terminal cell mode, connected to a programmable power supply (GW Instek PSP-405)

The initial electrode separation was 10 mm. The electrolyte used was prepared by first forming a mixture of molten salts (potassium chloride, lithium chloride and triethylamine hydrochloride, with a molar ratio 1:2:1). Around 10 ml of this mixture was added to 2 fold DMSO and stirred overnight to achieve a stable suspension.

All the experiments were carried out using constant current chronopotentiometry with an initial current density of 70 $mA/cm^2$.

The sample was electrolysed first for 30 minutes, washed was water and dried at 100° C., with the powder then being pressed into a pellet with the same dimensions as above. The new pellet was wrapped in a porous cotton fabric, and electrolyses as above for 4 hours. The washing, re-pelletizing, electrolysis steps were repeated twice more. The powder was then heated at 500° C. under argon to remove any volatile materials.

Characterisation

Raman spectra were obtained using a Renishaw system 1000 spectrometer coupled to a He—Ne laser (633 nm). The laser spot size was ~1-2 μm, and the power was about 1 mW when the laser is focused on the sample using an Olympus BH-1 microscope. The SEM images were taken using a Zeiss Leo 1530 FEGSEM. TEM analysis was conducted using FEI Tecnai FZO 200 kv FEGTEM.

Figure 5A:
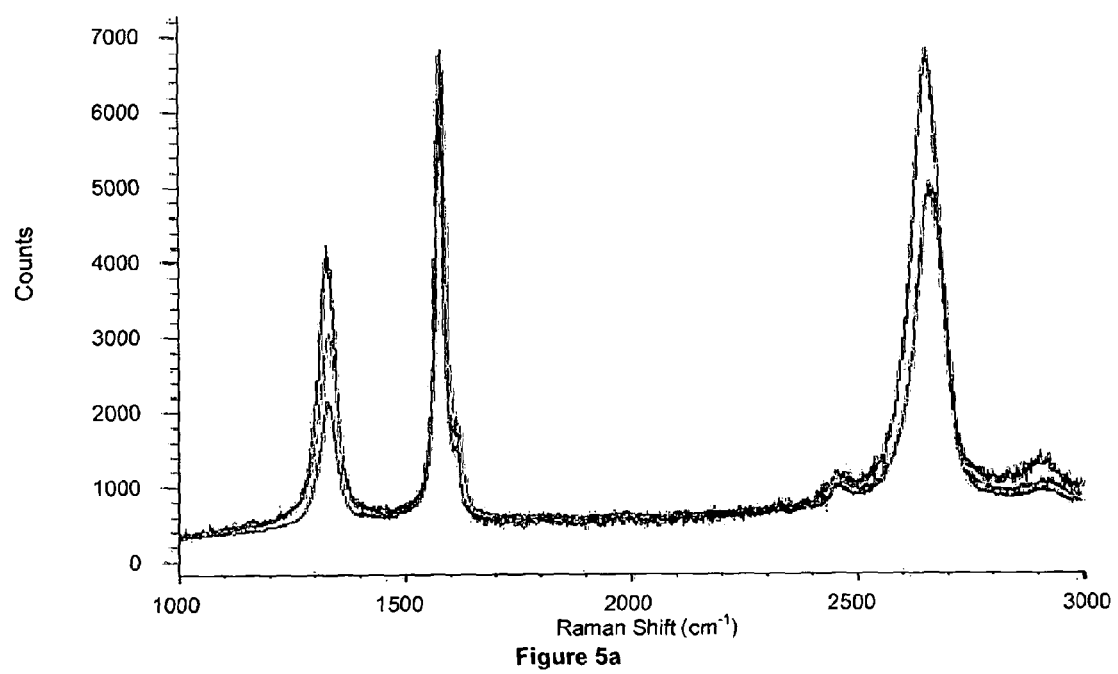
FIG. 5a shows the Raman spectra of material produced in Example 5.
Figure 5B:
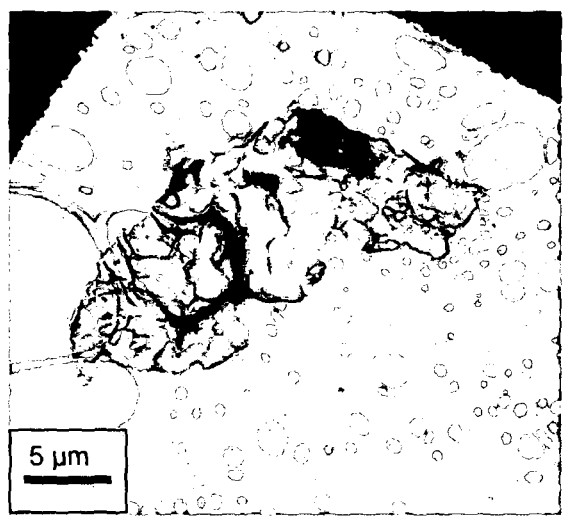
FIGS. 5b, 5c and 5d show TEM images of the material produced in Example 5.
Figure 5C:
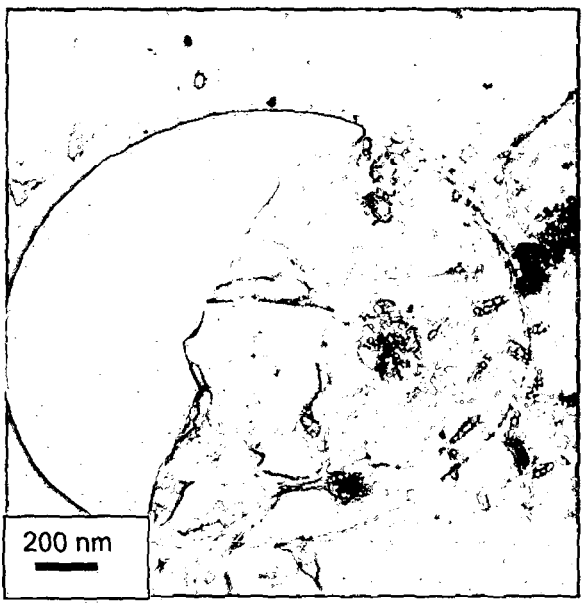
Figure 5D:
Figure 5E:
FIGS. 5e, 5f and 5g show SEM images of the material produced in Example 5.
Figure 5F:
Figure 5G:
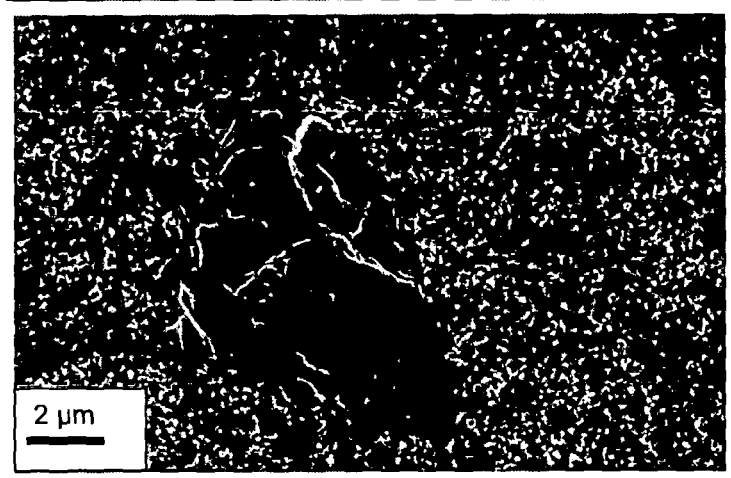

The measured Raman spectrum (see an example in FIG. 5a) has intense 2D bands at 2645 and 2669 $cm^{-1}$, with average FWHM=67 $cm^{-1}$. The 2D/G ratio is 0.75 to 0.9. The intensity of the G band is significantly higher than that of the D band, suggesting that the graphene has a low intensity of defects, TEM images are shown in FIGS. 5b, 5c, and 5d. As seen in the SEM images (FIGS. 5e, 5f and 5g), the size of the graphene sheets produced ranged from 2 μm to 10 μm.

REFERENCES

The following documents are all incorporated herein by reference.

[Novoselov 2004] Electric field effect in atomically thin carbon films, K. S. Novoselov et al., Science, 2004, 5296, pp 666-669.

[Ruoff 2009] Chemical methods for the production of graphenes, S. Park and R. S. Ruoff, Nature Nanotechnology, 2009, DOI:10.1038/nnano.2009.58

[Bae 2010] Roll-to-roll production of 30-inch graphene films for transparent electrodes, S. Bae et al. Nature Nanotechnology, 2010, DOI: 10.1038/NNANO.2010.132

[Ang 2009] High-Throughput Synthesis of Graphene by Intercalation-Exfoliation of Graphite Oxide and Study of Ionic Screening in Graphene Transistor, P. K. Ang et al., ACS Nano, 2009, 3(11), pp. 3587-3594

[Wang 2010] Direct exfoliation of natural graphite into micrometer size few layers graphene sheets using ionic liquids, X. Wang et al., Chem. Commun., 2010, 46, pp. 4487-4489

[Liu 2008] N. Liu et al, One-Step Ionic-Liquid-Assisted Electrochemical Synthesis of Ionic-Liquid-Functionalized Graphene Sheets Directly from Graphite. Adv. Funct. Mater. 2008, 18, pp. 1518-1525

[Lu 2009] One-Pot Synthesis of Fluorescent Carbon Nanoribbons, Nanoparticles, and Graphene by the Exfoliation of Graphite in Ionic Liquids, ACS Nano, 2009, 3(8) pp. 2367-2375

[Simonet 1977] J. Simonet and N. Lund, Electrochemical Behavious of Graphite Cathodes in the Presence of Tetralkylammonium Cations, J. Electroanal. Chem., 1977, 75, pp. 719-730

[Kinloch, 2003] I. A. Kinloch et al, E lectrolytic, TEM and Raman studies on the production of carbon nanotubes in molten NaCl, Carbon, 2003, 41, pp. 1127-1141

[Coleman 2008 & 2009] Y. Hernandez, et al, Nat. Nanotechnol., 2008, 3, 563; M. Lotya, et al, J. Am. Chem. Soc., 2009, 131, 3611.

[Valles 2008] Valles, C. et al. Solutions of negatively charged graphene sheets and ribbons. *J. Am. Chem. Soc.* 130, 15802-15804 (2008).

[Ferrari 2006] Ferrari, A. C. et al. Raman Spectrum of Graphene and Graphene Layers. *Phys Rev Lett*, 97 (2006), 187401

[Hao 2010] Hao, Y et al., Probing Layer Number and Stacking Order of Few-Layer Graphene by Raman Spectroscopy, *Small*, 2010, 6(2), 195-200

[Wang 2011] Wang, J., et al., High-yield synthesis of few-layer graphene flakes through electrochemical expanstion of graphite in propylene carbonate electrolyte, *JAGS*, 2011, 133, 8888-8891

[Gao 2008] Gao, L., et al., Electrodeposition of Aluminum from $AlCl_3/Et_3NHCl$ Ionic Liquids, Acta Physico-Chimica Sinica, Volume 24, Issue 6, June 2008, Pages 939-944

The invention claimed is:

1. A method for the production of graphene and graphite nanoplatelet structures having a thickness of less than 100 nm in an electrochemical cell, wherein the cell comprises:
   (a) a negative electrode which is graphitic;
   (b) a positive electrode; and
   (c) an electrolyte which comprises ions in a solvent, said ions comprising cations and anions, wherein the cations comprise organic ions and metal ions;
   and wherein the method comprises the step of passing a current through the cell wherein the cations are intercalated into the negative electrode.

2. The method according to claim 1, wherein the negative electrode comprises a layered graphite compound in which the cations can be intercalated.

3. The method according to claim 1, wherein the negative electrode comprises a graphite compound that is selected from highly ordered pyrolytic graphite, natural graphite and synthetic graphite.

4. The method according to claim 1, wherein the organic cations comprise alkylammonium cations.

5. The method according to claim 4, wherein the alkylammonium cations comprise tetraalkyl ammonium cations.

6. The method according to claim 5, wherein the alkylammonium cations are selected from tetrabutyl ammonium, tetraethylammonium and tetramethyl ammonium.

7. The method according to claim 4, wherein the alkylammonium cations comprise trialkyl ammonium cations.

8. The method according to claim 7, wherein the trialkylammonium cations are selected from tributyl ammonium, triethylammonium and trimethyl ammonium.

9. The method according to claim 4, wherein the alkylammonium cations comprise dialkyl ammonium cations.

10. The method according to claim 9, wherein the dialkylammonium cations are selected from dibutyl ammonium, diethylammonium and dimethyl ammonium.

11. The method according to claim 1, wherein the metal cations are iron cations.

12. The method according to claim 1, wherein the metal cations are tin cations.

13. The method according to claim 1, wherein the metal cations are lithium cations.

14. The method according to claim 1, wherein the electrolyte further comprises counter-ions selected from chloride, tetrafluoroborate, perchlorate and hexafluorophosphate.

15. The method according to claim 1, which is carried out a temperature from 20° C. to 100° C.

16. The method according to claim 1, wherein the graphene or graphite nanoplatelet structures having a thickness of less than 100 nm are separated from the electrolyte by at least one technique selected from:
   (a) filtering;
   (b) using centrifugal forces to precipitate the graphene or graphite nanoplatelet structures; and
   (c) collecting the graphene or graphite nanoplatelet structures at the interface of two immiscible solvents.

17. The method according to claim 1, wherein the graphene or graphite nanoplatelet structures having a thickness of less than 100 nm are electrochemically exfoliated from at least one electrode and wherein the method further comprises ultrasonicating the graphene or graphite nanoplatelet structures.

18. The method according to claim 1, wherein, prior to the step of passing current through the cell, graphite at the negative electrode is functionalised electrochemically by oxidation in nitric acid or fluorination using hydrofluoric acid, and wherein the method comprises electrochemically exfoliating the graphene or graphite nanoplatelet structures having a thickness of less than 100 nm from at least one electrode.

* * * * *